2 Sheets—Sheet 1.
A. F. GIBBONEY.
Fertilizer-Distributer and Seed-Drill.
No. 222,892. Patented Dec. 23, 1879.
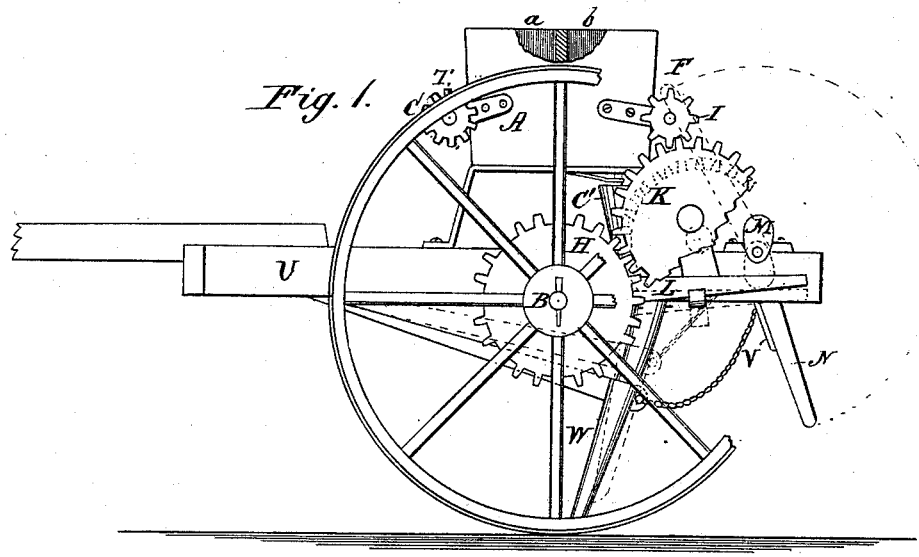
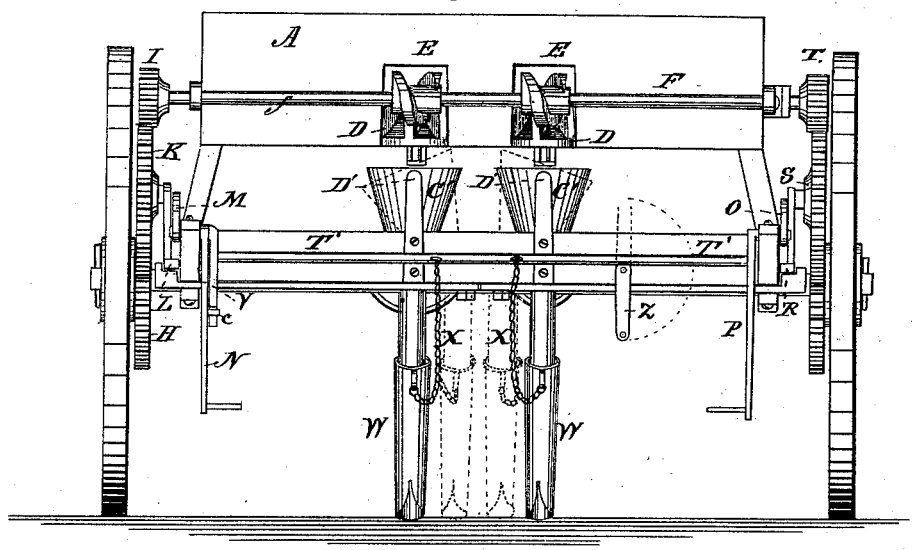
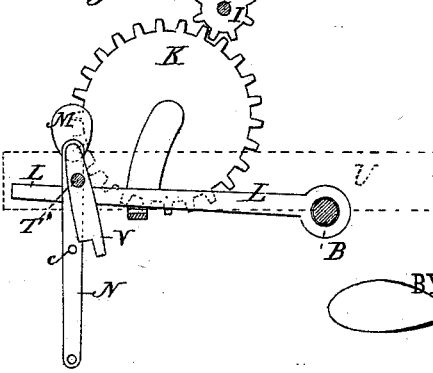
WITNESSES:
W. W. Hollingsworth
Amos W. Hart
INVENTOR:
A. F. Gibboney
BY
ATTORNEYS.

2 Sheets—Sheet 2.
A. F. GIBBONEY.
Fertilizer-Distributer and Seed-Drill.
No. 222,892. Patented Dec. 23, 1879.
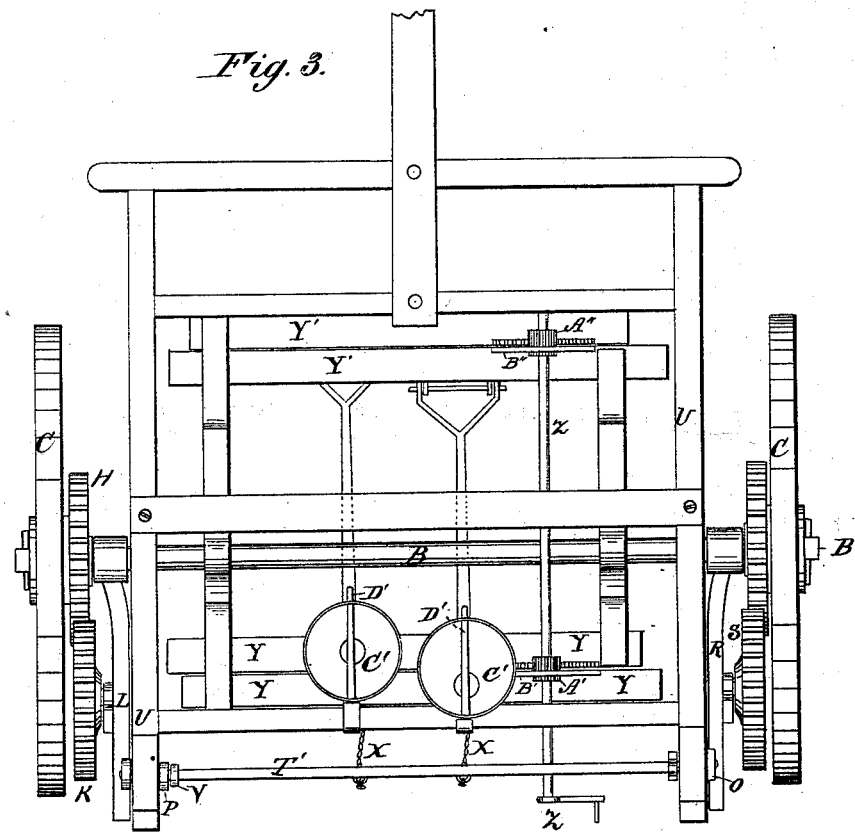
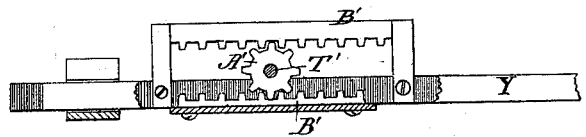
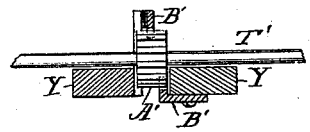
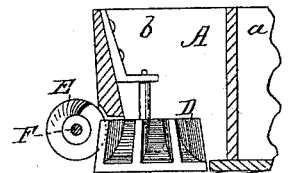
WITNESSES:
W. W. Hollingsworth
Amos W. Hart
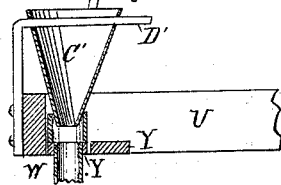
INVENTOR:
A. F. Gibboney
BY
ATTORNEYS.

UNITED STATES PATENT OFFICE.

ADOLPHUS F. GIBBONEY, OF BELLEVILLE, PENNSYLVANIA.

IMPROVEMENT IN FERTILIZER-DISTRIBUTERS AND SEED-DRILLS.

Specification forming part of Letters Patent No. 222,892, dated December 23, 1879; application filed August 6, 1879.

*To all whom it may concern:*

Be it known that I, ADOLPHUS F. GIBBONEY, of Belleville, in the county of Mifflin and State of Pennsylvania, have invented a new and Improved Fertilizer-Distributer and Seed-Drill; and I do hereby declare that the following is a full, clear, and exact description of the same.

The invention relates, first, to a force-feed formed by two meshing worm-wheels having their axes in different planes, and one of them located within and the other outside of the hopper; second, to mechanism for shifting the position of the fertilizer and seed tubes or drills independently of the hopper, for the purpose of depositing the fertilizer and seed in rows at different distances apart; and third, to the means for throwing into or out of gear, and thus starting or stopping, the mechanism for discharging the seed and fertilizer.

In accompanying drawings, forming part of this specification, Figure 1 is a side view of the machine, portions being broken away. Fig. 2 is a rear view of the machine. Fig. 3 is a plan view of the machine with the hopper and its attachments removed. Figs. 4, 5, 6, and 7 are detail sectional views.

The hopper A is mounted on a frame, which is supported on the axle B of transporting-wheels C in the usual way. Said hopper has two compartments, the front one, *a*, for the grain or seed, and the rear one, *b*, for the fertilizer.

The force-feed mechanism will, in practice, be applied or attached to both compartments *a b;* but the drawings show it attached to but one of them—to wit, the rear or fertilizer compartment, *b*. Said mechanism consists of two parts—one the wheel D, having inclined peripheral teeth or flanges, and fixed on a vertical axis so that it revolves in a horizontal plane, and the other the worm or spiral flanged wheel E, which is fixed on a horizontal axis, F, and works into the interdental spaces of the feed-wheel D. The latter is arranged within the compartment *b* and on the floor thereof; but the hopper is cut away to allow the required contact with the worm E, whose rotation with its shaft F causes the rotation of the feed-wheel D, which takes up and carries out of the hopper, and thus discharges, a portion of the fertilizer so long as it is in rotation.

The worm E not only rotates the feed-wheel D, but also clears the fertilizer out of its interdental spaces, and thus materially assists in discharging the contents of the hopper. The feed-wheel likewise performs a double function, in that it pulverizes the fertilizer and reduces it to the best condition for mingling with the soil.

The means for rotating the shaft F, and thereby operating the above-described force-feed, is the spur-gearing, consisting of the wheel H, which is attached to one of the transporting-wheels C, the pinion I, keyed on shaft F, and the intermediate gear, K, which is mounted on a journal fixed in an arm of a pivoted spring-supported bar, L. A cam or eccentric, M, is attached to the axis of a crank-lever, N, in such local relation to said bar L that by raising it into the nearly vertical position shown in dotted lines, Fig. 1, the bar will be depressed, thus taking gear K out of mesh with the pinion I, and consequently arresting the rotation of shaft F and the discharge of fertilizer.

The means for controlling the discharge of seed from compartment *a* are substantially the same as those above described for controlling discharge of fertilizer from compartment *b,* said means being applied to the right-hand side of the machine, as shown in Fig. 2, in which O indicates the cam, P the crank-arm, R the spring-bar, and S the movable or shifting member of gearing, by which rotatory movement is transmitted to rotary shaft T on the front side of hopper A. From said shaft T motion is imparted to feed mechanism, (not shown,) which will, in practice, be arranged in relation to compartment *a* as parts D and E are in relation to compartment *b*. From said crank arm or lever P a rod or shaft, T', extends across to an arm, V, which is pivoted in the opposite side of the frame U. Said arm V will engage a stud, *c*, on lever N when raised. By this arrangement, when lever P is raised its cam will depress the spring-bar R, and thus carry gear S out of engagement with its neighbors, and thus arrest the discharge of seed from compartment *a*, and at the same time the arm V, which moves with said lever P, will raise the opposite lever, N, and arrest the discharge of fertilizer. Thus the lever P controls the action of both cams M O and intermediate gears, K S, and causes them to operate simultaneously to throw the seed and fertilizer force-feed mechanism out of action; but it will not throw them simultaneously into action, since the lever N must be depressed or thrown down independently for causing the fertilizer feed-wheel D to begin to rotate. As before stated, said lever N may be raised independently to arrest the discharge of fertilizer, when desired, without affecting the discharge of seed.

In addition to the operation and function of the lever P and shaft T' above stated, they have another—to wit, to raise or lower the drill-tubes W. For this purpose the latter are connected to the shaft T' by chains X, which wind off or on the same, according as the arm P is raised or lowered.

It will be seen that the seed-drills are raised when the seed force-feed mechanism is thrown out of action, and, vice versa, they are lowered when said mechanism is put in operation.

To allow lateral shifting of the drill-tubes I attach them to bars Y Y', which are arranged horizontally parallel to each other and the axle B. One pair of such bars, Y, is arranged in rear of the axle, and the other pair, Y', in front thereof, and the fertilizer and seed drills W (fertilizer-drills not shown) are correspondingly attached to them. The two bars Y Y move in opposite directions, and the bars Y' Y' ditto, so that the drill-tubes of each pair are moved farther apart or brought nearer each other, according as the respective bars are shifted in one direction or the other.

The means for shifting the several bars are a crank-shaft, Z, having pinions A' A'' and racks B' B''. which latter are attached to the bars Y Y'. The rear pinion, A', meshes with the racks B' of the two rear bars, Y, and the pinion A'' with the racks B'' of the front bars, Y'. Hence, by oscillating the shaft Z the drills will be adjusted so as to cause the fertilizer or seed, or both, to be deposited at the required distance apart—say, eight or sixteen inches apart, the latter space permitting cultivation between the rows when the grain is growing.

While the drill-tubes proper are thus adapted to shift laterally, it is requisite, or at least preferable, that their funnels C' should not be thus arranged. They are accordingly hung on horizontal axes D', and tilt thereon when the tubes move out of vertical alignment with them, as will be readily understood from Figs. 2 and 3.

What I claim is—

1. In a fertilizer-distributer or seed-planter, the combination, with a hopper having an opening, as specified, of the toothed wheel D and the worm E, which meshes with and operates the latter, as shown and described.

2. In a fertilizer-distributer or seed-planter, the combination of transporting-wheel, gearing, shaft F, worm-wheel E, feed-wheel D, rotating in a horizontal plane, and the apertured or slotted hopper, as shown and described.

3. In a fertilizer-distributer or seed-planter, the combination of the parallel horizontal bars adapted for endwise movement, the drill-tubes and racks attached thereto, and the shaft having pinions fixed thereon and arranged at right angles to said bars, all as shown and described, for the purpose specified.

4. In a fertilizer-distributer or seed-planter, in combination with the lever N and mechanism for throwing the force-feed of the fertilizer-compartment b out of action, the lever P, rock-shaft T, arm V, and the mechanism for throwing the force-feed mechanism of the seed-compartment a out of action, as shown and described.

ADOLPHUS F. GIBBONEY.

Witnesses:
W. C. NELSON,
J. A. STEELE.